Figure 1:
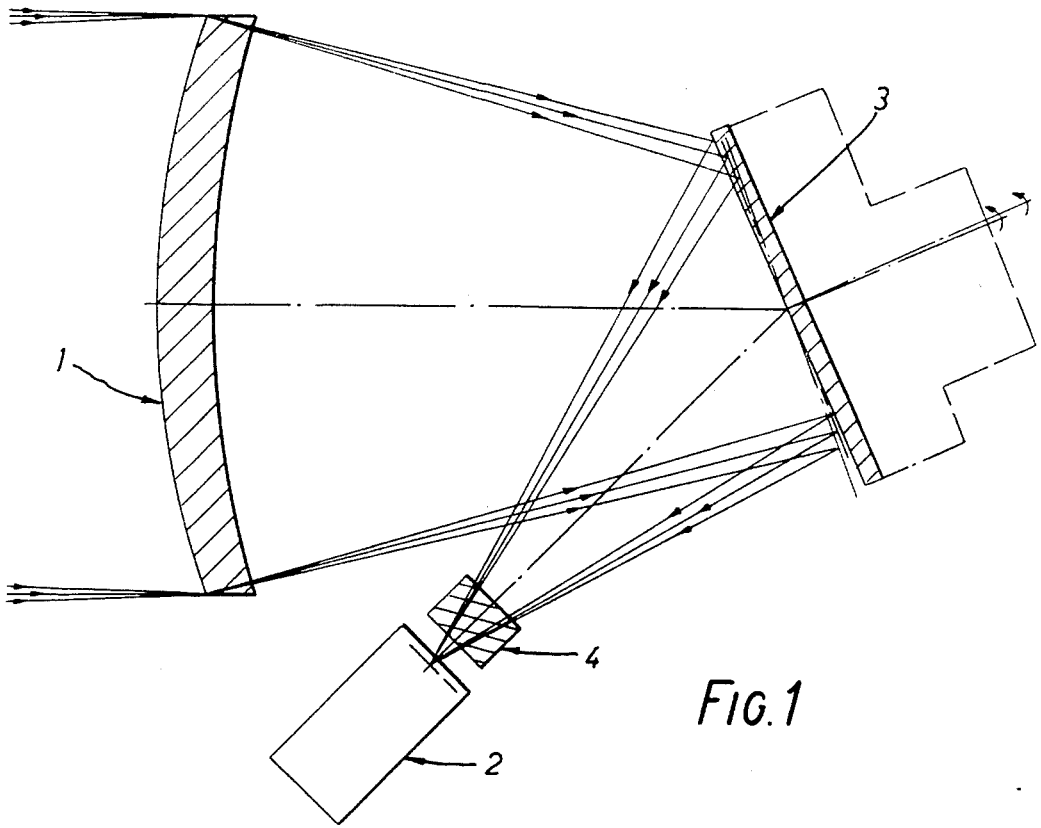

United States Patent
Forse

[11] 3,847,466
[45] Nov. 12, 1974

[54] SCANNING ARRANGEMENTS

[75] Inventor: David Patrick Searle Forse, Middlesex, England

[73] Assignee: EMI Limited, Hayes, Middlesex, England

[22] Filed: Aug. 21, 1973

[21] Appl. No.: 390,257

[30] Foreign Application Priority Data
Sept. 2, 1972 Great Britain.................... 40815/72

[52] U.S. Cl.......................... 350/7, 350/6, 350/285, 178/7.6, 74/63
[51] Int. Cl. ........................................... G02b 17/00
[58] Field of Search ............ 350/6, 7, 285; 178/7.6; 356/23–26; 74/63, 64

[56] References Cited
UNITED STATES PATENTS
2,853,918  9/1958  Yoler ..................................... 350/7
3,591,249  7/1971  Wildhaber ............................. 350/6

Primary Examiner—Ronald L. Wibert
Assistant Examiner—Michael J. Tokar
Attorney, Agent, or Firm—Fleit & Jacobson

[57] ABSTRACT

Radiation, such as infra-red radiation, incident upon a plane mirror is scanned optically over one or more radiation sensitive detectors. The scanning is caused to be substantially linear in time by superimposing on the mirror two contra-directed rotary motions, the two motions being at substantially the same angular rate.

6 Claims, 3 Drawing Figures

SCANNING ARRANGEMENTS

The present invention relates to scanning arrangements and it relates more particularly to such arrangements for scanning incident radiation, for example infra-red radiation, relative to one or more detectors. The invention is especially, though not exclusively, suitable for mounting in an infra-red scanning device carried in a land vehicle.

It is desirable in some circumstances that an arrangement of the kind described above be capable of effecting a line scan which is substantially linear in time. In principle, such a line scan could be achieved by causing a plane reflector, disposed in the path of radiation to a detector, to oscillate in the manner, for example, of image motion compensating mirrors used in the motion picture industry. Such an oscillating reflector arrangement is subject to two main disadvantages, however. Firstly, the oscillatory movement required is generally small and this renders it difficult to monitor the instantaneous scan angle sufficiently accurately to enable the oscillatory motion of the mirror to be synchronised with the scanning motion of a display device — for example, a cathode ray tube device — which is linked to the detector. Secondly, and particularly when high scanning rates are required, oscillatory arrangements are prone to the production of vibrational forces which are undesirable since such vibrations induce wear and can also interfere with the operation of the sensitive detectors employed for detecting infra-red radiation.

According to the invention there is provided a scanning arrangement including reflector means having a planar reflecting surface, arranged to direct received radiation toward detector means, means for rotating the surface in a first direction about an axis inclined to the normal to said surface, and means for causing said axis to precess about a second axis, inclined with respect to both the normal and said first mentioned axis, in a direction opposite to said first direction, the rotation and the precession being at substantially the same rate.

The resultant scan achieved by the arrangement is substantially in a single plane in space and varies substantially sinusoidally in time with the two superimposed rotations. The approximation of the resultant scan to linearity in time, thus depends upon the fraction of said rotations used for the active scan, since part of a sinusoidal variation, that between about −45° and +45°, is substantially linear. It is to be noted that the resultant scan is achieved using two superimposed rotary motions which can be well balanced, thus causing little vibration.

Figure 2:
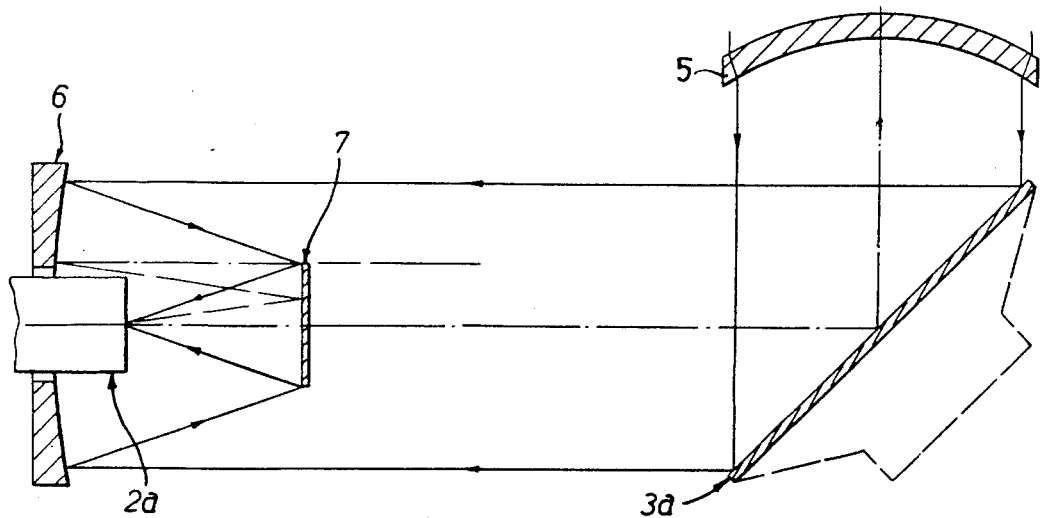
Figure 3:
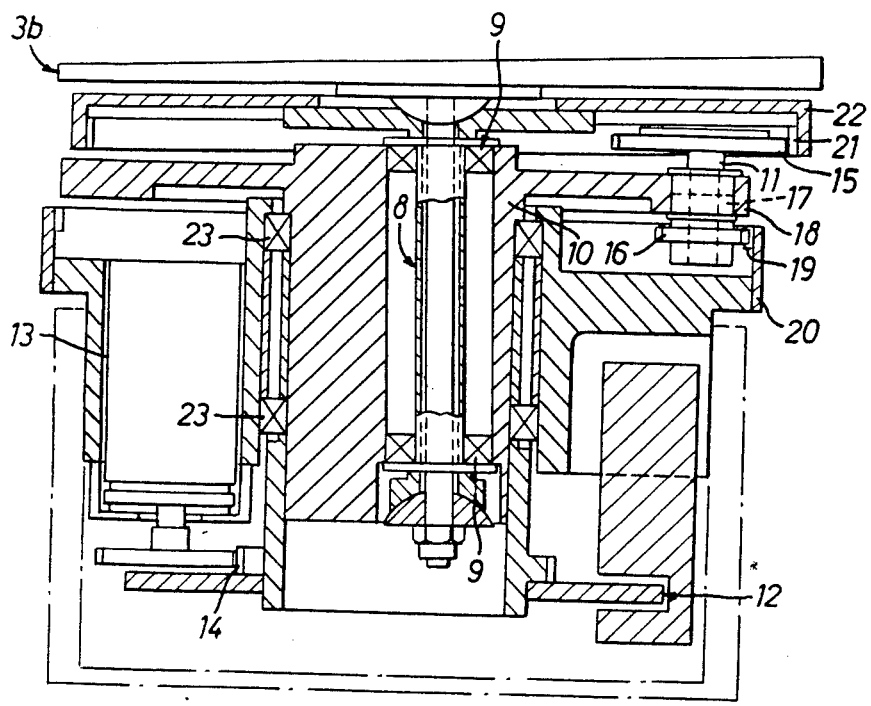

In order that the invention may be clearly understood and readily carried into effect, the same will now be described by way of example only, in terms of specific embodiments with reference to:

FIG. 1 shows, in part sectional and part block schematic view, an arrangement in accordance with one example of the invention, FIG. 2 shows, in similar view to FIG. 1, an arrangement in accordance with another example of the invention, and FIG. 3 shows, in cross-sectional view, a reflector suitable for use in an arrangement according to the invention and means for imposing two contra-rotating scans thereon.

Referring now to FIG. 1, incident radiation, such as infra-red radiation, is incident on the arrangement via a window which is constituted by a lens 1, and the lens focuses said radiation, via a folded path, on to a detector array 2. Interposed between the lens and the detector array is a reflector 3, which comprises a plane mirror, upon which is imposed two oppositely directed rotary motions about respective axes which are both inclined to the normal to the planar surface of the mirror in order to cause the mirror 3 to scan the radiation emerging from the lens 1 in a substantially linear fashion over the detector array 2. The field of view for the arrangement is determined by the length of the detector array in one plane and the angle embraced by mirror 3 in the other plane. A suitable mirror 3 and associated driving means therefor will be described hereinafter with reference to FIG. 3. In some circumstances it may be advantageous to cause interlacing of successive scans, and to this end an interlace plate 4 is interposed between the mirror 3 and array 2. The interlace plate 4 is moveable to effect movement of the radiation at right angles to the direction of scan.

Referring now to FIG. 2, incident radiation enters via a window 5, which is constituted by a germanium meniscus, and is directed via a scanning reflector 3a, a spherical primary mirror 6 and a folding mirror 7 onto a detector array 2a. The meniscus 5 is concentric with the mirror 6 and is used to compensate for spherical aberration of the mirror. The scanning reflector 3a is similar to the mirror 3 of FIG. 1, and rotates about the centre of curvature of elements 5 and 6 to produce the required scan, thus not disturbing the concentricity of elements 5 and 6, hence the scan introduces substantially no aberrations. A mirror and scanning drive means therefor, suitable for use in either of the arrangements described above, will now be described with reference to FIG. 3.

In this figure, it is shown how two oppositely directed rotary motions about respective axes which are inclined to each other are imposed on the mirror, giving a resultant line scan. This is achieved by mounting the mirror 3b on a rotatable shaft 8, thus to provide a first rotary motion, the normal to the mirror being inclined to the axis to rotation of the shaft. To produce the second rotary motion, the shaft 8 is carried on bearings 9 and inside a second rotatable shaft 10 arranged so that the axes of rotation of the two shafts are inclined. If the two angles (i.e., the angle of inclination of the two axes of rotation and the angle between the normal to mirror 3 and the axis of rotation of shaft 8) are equal in sense and angle, the line scan may be obtained.

In both the examples illustrated, the axes of rotation intersect at the surface of the mirror. In FIG. 1 this causes the convergent beam falling on the detector to rotate about the centre of the mirror. The radius of this rotation is chosen to match the image plane curvature of the lens, thus giving minimum aberration due to scanning.

In FIG. 2, as indicated previously, the scan must occur about the centre of curvature of the system.

The gear system 11 shown in FIG. 3 ensures that the two rotary motions contra rotate at equal speeds and the encoder 12 on the outer shaft 10 indicates the instantaneous position of the scan. As the rotation of the mirror about the shaft is much greater than the scan angle the accuracy required to measure the scan angle is greatly reduced.

The prime mover of the system is a drive motor 13, which drives the outer shaft 10 via a gear arrangement 14. The outer shaft 10, when it rotates, carries bodily with it the gear system 11 which carries upper and lower gear wheels 15 and 16 respectively which are formed on a common shaft 17, the latter being rotatable in a bearing 18. The lower gear wheel 16 engages with teeth provided around an annular region 19 formed in a stationary part 20 of the system, so that as shaft 10 rotates, the bodily movement of gear system 11 relative to the annular region 19 and the cooperation of gear wheel 16 with the teeth in region 19 causes the upper gear wheel 15 to rotate. This wheel 15 cooperates with teeth formed in an annular region 21 of a flange 22 coupled to the inner shaft 8 and causes rotation thereof in the opposite sense to the rotation of shaft 10 but at the same angular speed. The speed synchronisation is achieved by means of suitable choice of the numbers of teeth on the wheels 15 and 16 and in the regions 19 and 21. The outer shaft 10 can rotate relative to the stationary parts of the system by virtue of bearings 23. It should be noted that 16 and 19 are straight-cut spur gears but 15 and 21 require a small helix angle to accommodate the angle between shafts 8 and 10.

In regard to interlace, it should be noted that the function may be provided approximately by the scan mirror. If the two contra-directed rotary scans are deliberately mis-matched in phase by an amount equivalent to one-half of a line scan, the resulting scan is an ellipse with the length of the mirror axis equivalent to one line. Using this technique, a good interlace is obtained at the centre of the field of view, but at the edge of the field of view the interlace amplitude reduces. Alternate lines are scanned left to right and right to left respectively.

In image space scanners such as that shown in FIG. 1, it is possible to alter the field curvature introduced by the scan mirror by varying the position of the intersection of the two axes of rotation. If the intersection is in front of the mirror, the curve is flattened and the converse is true if the intersection is behind the mirror. This feature allows greater latitude in the relative positioning of the optics, mirror and detector than is possible with a conventional scan mirror, while retaining good matching between the field curvature of the optics and scan mirror.

It should be noted that in the arrangement of FIG. 3, the said intersection (i.e., the intersection of the centre lines of axes 8 and 10) lies well in front of the mirror.

What I claim is:

1. A scanning arrangement including reflector means having a planar reflecting surface arranged to direct received radiation toward detector means, means for rotating the surface in a first direction about an axis inclined to the normal to said surface, and means for causing said axis to precess about a second axis, inclined with respect to both said normal and said first mentioned axis, in a second direction, opposite to said first direction, the rotation and the precession being at substantially the same rate.

2. An arrangement according to claim 1 wherein said means for causing said first mentioned axis to precess includes a tubular shaft, drive means for rotating said shaft in said second direction and means for rotatably mounting a second tubular shaft within the first mentioned shaft, the axes of the two shafts being inclined to one another, and the axis of the second shaft being the said first mentioned axis.

3. An arrangement according to claim 2 wherein said planar reflecting surface is secured to one end of said second tubular shaft, the plane of the mirror being inclined with respect to a plane orthogonal to the axis of said second shaft.

4. An arrangement according to claim 3 wherein said drive means comprises a motor which is located so as to be stationary with respect to said first tubular shaft and is arranged to drive a gear wheel which is adapted to co-operate with gear teeth provided around the perihery of a region of said first tubular member.

5. An arrangement according to claim 4 wherein the first tubular member is formed with a flange having an aperture in which a further gear shaft is located so as to be freely rotatable therein, said further shaft being provided with respective gear wheels at either end thereof; wherein the said first tubular member is surrounded by a casing part which is stationary with respect thereto, and co-axial therewith, the said casing part being formed with gear teeth with which one of the gear wheels on said further shaft can co-operate to cause rotation of said further shaft when said first tubular member rotates; and wherein said second tubular shaft is provided with a flange which is formed with gear teeth around an annular part thereof, the last mentioned flange being positioned so as to co-operate with the other gear wheel on said further shaft so as to enable the second tubular shaft to be rotated.

6. An arrangement according to claim 2 wherein said first tubular shaft is formed with an encoding disc arranged to co-operate with a sensing device to enable the angular position of the said first tubular shaft to be monitored.

* * * * *